No. 825,085. PATENTED JULY 3, 1906.
L. STEINBERGER.
LOCKING NUT.
APPLICATION FILED SEPT. 30, 1903.
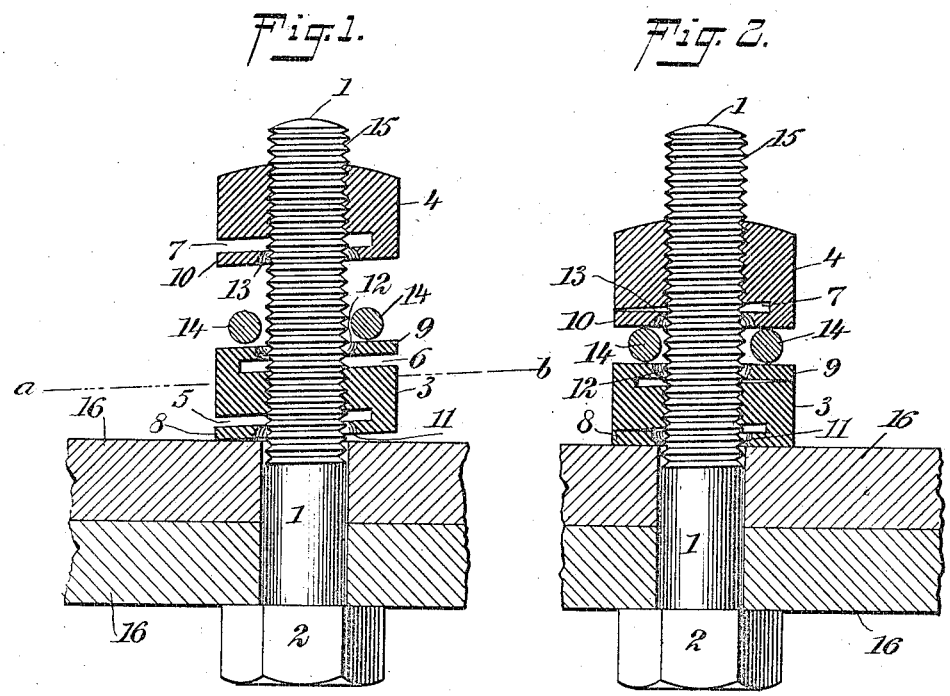
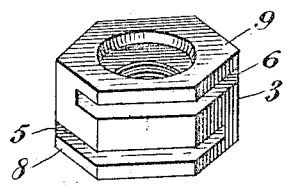
WITNESSES:
William P. Goebel.
Walton Harrison
INVENTOR
Louis Steinberger
BY
ATTORNEYS

UNITED STATES PATENT OFFICE.

LOUIS STEINBERGER, OF NEW YORK, N. Y.

LOCKING-NUT.

No. 825,085.

Specification of Letters Patent.

Patented July 3, 1906.

Application filed September 30, 1903. Serial No. 175,134.

*To all whom it may concern:*

Be it known that I, LOUIS STEINBERGER, a citizen of the United States, and a resident of the city of New York, borough of Brooklyn, in the county of Kings and State of New York, have invented a new and Improved Locking-Nut, of which the following is a full, clear, and exact description.

My invention relates to locking-nuts, and more particularly to a form of locking-nut admitting of general use and peculiarly applicable in instances where it is desired to lock a nut used in electrical fixtures and especially for the purpose of securing wires in position.

Reference is to be had to the accompanying drawings, forming a part of this specification, in which similar characters of reference indicate corresponding parts in all the figures.

Figure 1 is a vertical section through a locking-nut of my invention, showing two forms of nut each provided with a lock, the nuts being separated. Fig. 2 is a somewhat similar view, but showing the nuts as tightened upon the bolt; and Fig. 3 is a perspective view showing the form 3 of the nut.

A bolt 1 is provided with a head 2 and is threaded, as shown. Revoluble nuts 3 4 are threaded internally and screwed upon the bolt 1. The nuts 3 4 are provided with slots 5 6 7, whereby portions or tongues 8 9 10 are spaced apart from the main body. These portions or tongues are each provided with smooth apertures 11 12 13, being thereby clear of the threads 15 of the bolt. A wire 14 may be clamped between the two nuts, as indicated in Fig. 2. The nuts 3 4 in their relations to the bolt 1 are somewhat askew—that is to say, the normal plane of the nut crosses the axis of the bolt in a direction which is not quite at right angles to the axis of the bolt. This can readily be seen by a glance at Fig. 1. The result is that when the nut 3 is screwed down upon the members 16 to be clamped the tongue 8 engages the upper member 16 and exerts a gentle pressure upward, so as to lock the nut 3 rigidly upon the stem of the bolt. The nut 3 being now turned is forced downward, so that its bottom face becomes flush with the upper member 16, as indicated in Fig. 2. No other agency is needed to hold the nut rigidly in position, for the reason that the tongue is resilient, and the aperture 11 being smooth and larger than the threads 15 of the bolt the tongue 8 merely bends enough to engage its lower flat face throughout its entire area against the upper surface of the member 16. The upper surface of the tongue 8 is engaged by the body portion 3 of the nut at substantially the same moment that the lower face of the tongue 8 assumes the position indicated in Fig. 2. If desired, the other nut 4 may now be placed upon the bolt and run down upon the thread, so as to lock wire between the upper portion of the nut 3 and the lower portion of the nut 4. The upper nut will hold the lower nut still more rigidly in position.

It will be observed that this self-locking nut is not dependent upon an auxiliary part or parts except the bolt and the surface or wire to be clamped. No extraneous mechanism is needed to enable a person to loosen the nut when it is desired to remove the same from the bolt. The nut when in position upon the bolt binds with great but uniform pressure upon the object to be clamped and is thus held securely against accidental or undesirable rotation of the nut. It may be applied in any position and practically in any place and upon any work or to any structure where bolts provided with revoluble nuts may be needed.

It will be noted that this nut has the quality of yielding, owing to the resilience of the upper and lower tongues. This feature is of great importance, as it avoids all necessity for bending the bolts and also relieves the threads from undue strain. This feature is of peculiar importance in cases where the parts held together are subjected to sudden jars, as in rail-bolts of fish-plates and in all machinery subjected to strain.

The operation of the self-locking nut is so simple as to be self-evident even to the most inexperienced person. It is first threaded upon the bolt in the ordinary manner and then screwed down upon the article to be held thereby. Its own shape suggests its uses.

It will be noted that the "plane" of the nut hereinafter mentioned means the plane drawn through the line $a\ b$ of Fig. 1, this plane being inclined or oblique relative to the horizon, assuming the bolt to be vertical. The general plane of the nut is therefore slightly askew or oblique relative to the plane forming a right angle with the axis of the bolt.

In case it is desired to secure a wire 14 upon the stem 1, the nut 4 may be closed down upon the wire, as indicated in Fig. 2. The tongues 9 10 thus clamp the wire from above and below, giving it a comparatively resilient fastening of integral metal and thus affording a good electrical connection.

Having thus described my invention, I claim as new and desire to secure by Letters Patent—

In a locking-nut, the combination of a revoluble body portion provided with a cylindrical threaded aperture and with resilient tongues, one for engaging a surface to be clamped and the other being free, in combination with mechanism for engaging said tongue thus left free, the general position of said revoluble body portion being askew relatively to the axis of said cylindrical threaded aperture.

In testimony whereof I have signed my name to this specification in the presence of two subscribing witnesses.

LOUIS STEINBERGER.

Witnesses:
  WALTON HARRISON,
  EVERARD BOLTON MARSHALL.